July 11, 1933.  H. A. SALLOP  1,917,904
SEAT COVERING
Filed Nov. 17, 1930  3 Sheets-Sheet 1
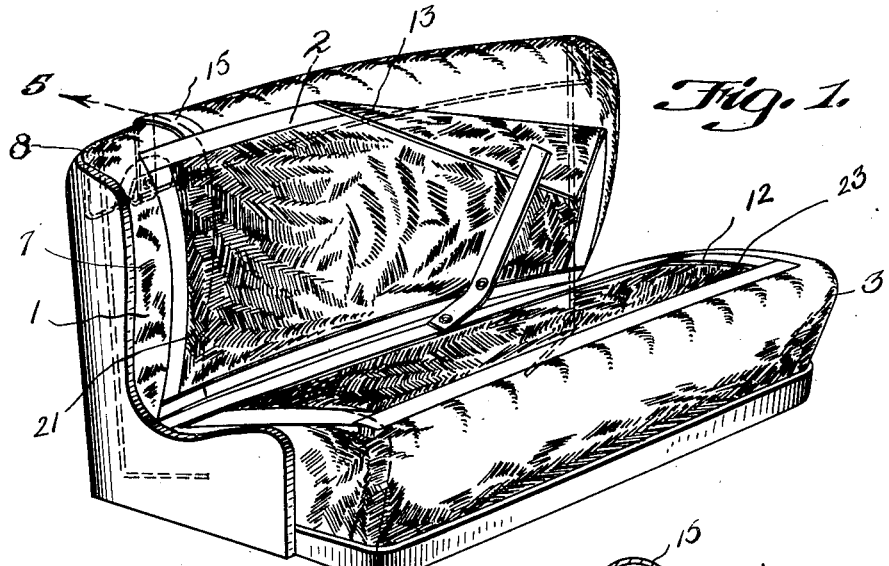
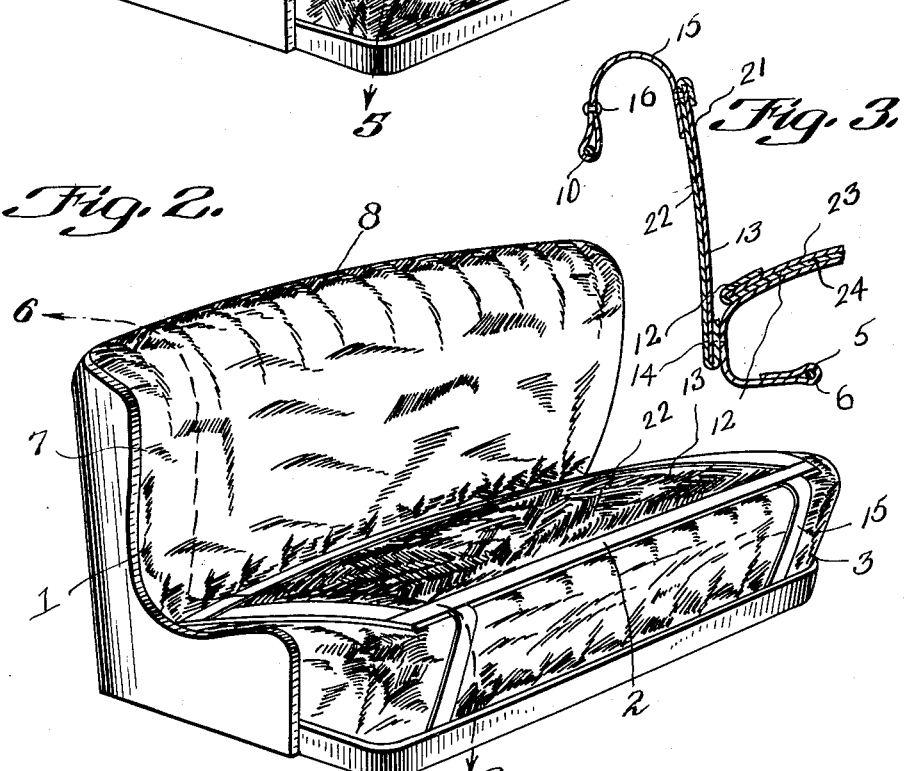
INVENTOR.
Harry A. Sallop
BY
Wm. R. Smith
ATTORNEY.

July 11, 1933.  H. A. SALLOP  1,917,904
SEAT COVERING
Filed Nov. 17, 1930  3 Sheets-Sheet 2
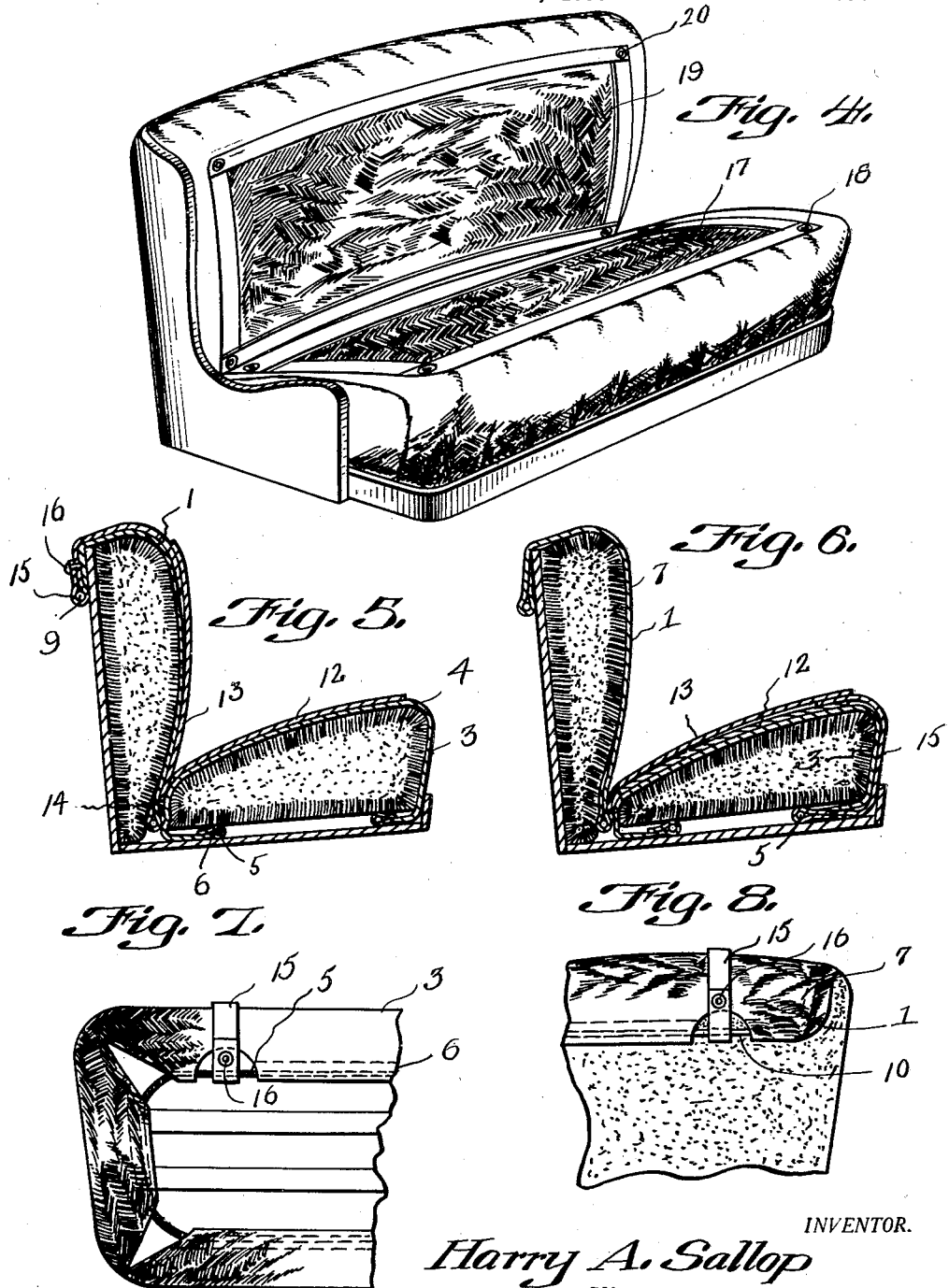
INVENTOR.
Harry A. Sallop
BY
Wm. R. Smith
ATTORNEY

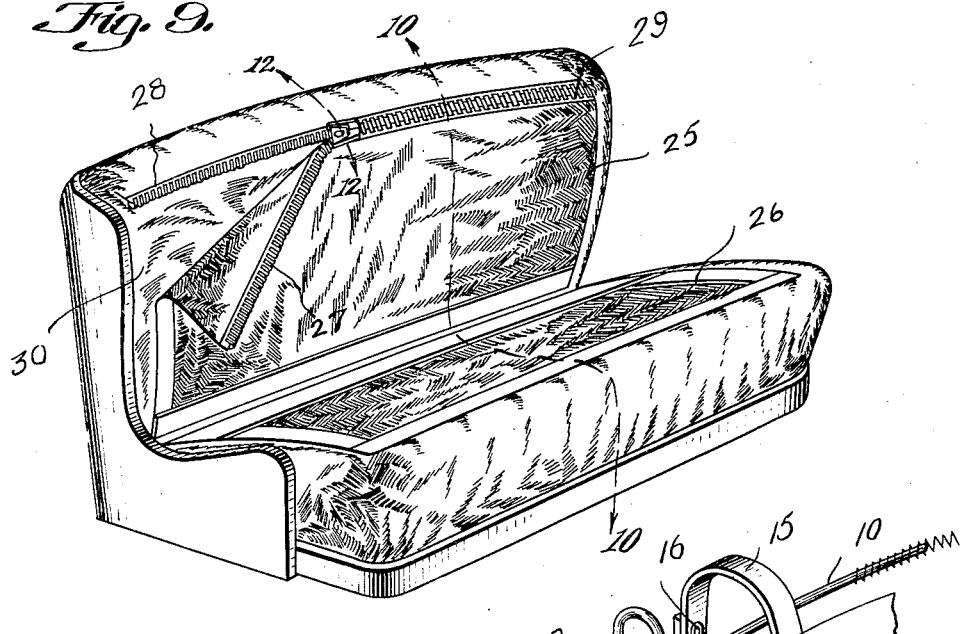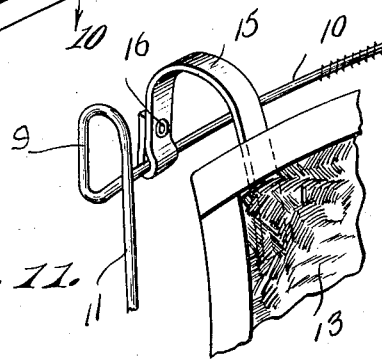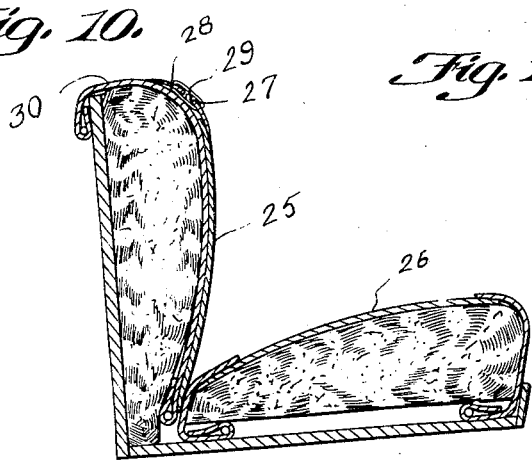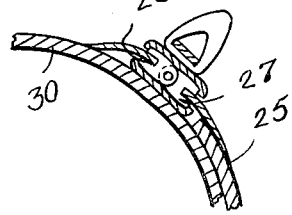

Patented July 11, 1933

1,917,904

UNITED STATES PATENT OFFICE

HARRY A. SALLOP, OF NEW YORK, N. Y.

SEAT COVERING

Application filed November 17, 1930. Serial No. 496,179.

This invention relates to an automobile seat covering and has for its primary object the providing of duplex covers adjustably related whereby the same may be converted for summer or winter use.

An object of the invention is the provision of a plurality of covers, units connected in a unique manner to enable change in the characteristics of the exposed surfaces of the covering of an automobile seat structure.

Another object of the invention relates to the construction of a seat cover of dissimilar materials so arranged that one material may be substituted for the other material for use without completely detaching the covering from the automobile seats.

Another object of the invention resides in the novel manner of connecting the auxiliary cover unit to the main cover unit without the use of pins of other forms of fastening devices mounted direct in the upholstery of the automobile.

A feature of my invention resides in the use of a zipper type of fastener for securing an edge portion of one of the auxiliary cover units to the main cover unit, thereby providing a neat fitting connection.

With these and other objects in view the invention will be better understood from the following detailed description taken in connection with the accompanying drawings wherein:

Figure 1 is a perspective view illustrating one form of my invention.

Figure 2 is a perspective view illustrating the auxiliary cover unit in a folded parallel relation with the cushion.

Figure 3 is a sectional view of a portion of the covering as removed from the seat structure.

Figure 4 is a perspective view of another form of my invention.

Figure 5 is a sectional view on line 5—5 of Figure 1.

Figure 6 is a sectional view on line 6—6 of Figure 2.

Figure 7 is a bottom plan view of a portion of the cushion cover unit.

Figure 8 is a rear elevation of part of an automobile seat back showing position of my invention thereon.

Figure 9 is a perspective view of another form of my invention.

Figure 10 is a sectional view on line 10—10 of Figure 9.

Figure 11 is a perspective view of that form of my invention illustrated in Figure 1.

Figure 12 is a sectional view on line 12—12 of Figure 9.

Again referring to drawings illustrating several of the many forms of my invention and more particularly to that construction illustrated in Figure 1, the numeral 1 designates broadly the main cover unit, and the numeral 2 designates broadly the auxiliary cover unit. These units are connected together in a manner that the main cover unit may be quickly and effectively applied to the automobile seat with the auxiliary cover unit capable of selective movement into covering position with the back and seat portions of the main cover unit 1.

As shown in Figure 1 the main cover unit 1 designed along the lines of my original invention set forth in my co-pending application filed August 31, 1929, Serial No. 389,635, consists of a cushion cover section 3, neatly arranged upon the cushion 4, of the seat and held in place by the attaching cord or coil spring 5, mounted in the seam 6, of the section 3. The remaining portion of the main cover unit 1 consists of a cover section 7, which is neatly arranged over the back of the automobile seat as indicated at 8, and held in place by a unique type of frame 9, more specifically described and claimed in the above mentioned application, but broadly consisting of a cross bar 10, and end limbs 11 interlocking with the seat structure.

The auxiliary cover unit comprises a cushion cover section 12, permanently or removably connected to the top surface of the cover section 3. The back cover section 13 of the auxiliary cover unit is arranged to be selectively moved into covering position with relation to the section 12, or moved into covering relation with the main cover section 7. One manner of accomplishing this desired objective is by having the lower marginal edge portion of the section 13 sewed to the cover section 3 as indicated at 14, thus allowing the section 13 to be thrown into parallel relation with the section 12 or in parallel relation with the section 7.

The section 13 may be detachably connected to the section 7 in any suitable manner. For the purpose of illustration, I have shown in Figure 1, the section 13 provided with straps 15 engageable over the edge portion of the automobile seat back and engaging around the cross bars 10 to be secured in place by the fasteners 16.

In Figure 4 I have illustrated the auxiliary cover section 17, provided with snap fasteners 18 removably securing the same to the main cover unit and I have also illustrated the auxiliary cover section 19 provided with the snap fasteners 20 for detachably securing the same to the back portion of the main cover unit.

In the use of the seat covering just described the main cover unit is placed over the back and cushion of the seat as set forth in the above mentioned co-pending application and as the seat cover section 12 is secured directly to the top surface of the cover section 3, it will be appreciated that the same is in proper position for use. Cover section 13 is arranged in parallel relation with section 12 and as this section 13 has a straw surface sheet 21 and a back fabric surface sheet 22, it will be appreciated that when section 13 rests upon section 12, the back fabric sheet 22 will be exposed to use thereby converting the covering for winter use as only fabric material is exposed to the user. When the cover section 13 is thrown in position to cover the back portion of the main cover unit 1, the surface sheet 21 of straw or other material will be exposed for use in conjunction with the straw surface of section 12, thereby converting the covering for summer use. When the cover unit 1 is to be used for winter use and unit 13 is folded over unit 12, with the straps 15 effectively holding the sections 12 and 13 in smooth parallel relation by being attached to cord 5 as shown in Figure 7. The cover section 12 is constructed similar to the cover section 13, having a straw surface sheet 23 and a back fabric surface sheet 24.

In Figures 9, 10 and 12 I illustrate the auxiliary cover section 26, attached permanently to the main cover unit with the companion auxiliary cover section 25 movably associated with the back section of the main cover unit. In this particular showing the section 25 has the marginal edge portion fixed to a portion of the main cover unit with the upper edge portion associated with a zipper type fastener 27, one unit 29 of which is carried by the marginal edge portion and the other fastener element 28 permanently fixed to the back portion 30.

It will now be appreciated that I have designed an automobile seat covering of a unique construction embodying a plurality of cover units associated in an original manner to enable the covering to be satisfactorily used in summer as well as in winter. Of course it is to be understood that the various units may be connected in various other manners other than illustrated and the main cover unit attached to the automobile seat by various forms of attachments and therefore I do not desire to be limited in protection in any manner whatsoever, except as set forth in the following claims:

What I claim is:

1. In combination with the seat back and seat cushion of a seat structure, a back cover attached to the seat back and having a panel attached thereto which presents a face of one material, a cushion cover which presents a face of another material attached to the cushion of the seat and an auxiliary cover unit swingingly mounted to one of said covers at their juncture to swing into position to cover said panel or to swing into position to cover said cushion cover, said auxiliary cover presenting a face matching said panel when covering said cushion cover and presenting a face matching said cushion when covering said panel.

2. In combination with the seat back and seat cushion of a seat structure, a back cover attached to the seat back and having a panel attached thereto which presents a face of one material, a cushion cover which presents a face of another material attached to the cushion of the seat and an auxiliary cover unit swingingly mounted to one of said covers at their juncture to swing into position to cover said panel or to swing into position to cover said cushion cover, said auxiliary unit presenting a face matching said panel when covering said cushion cover and presenting a face matching said cushion cover when covering said panel and a slide fastener for securing the auxiliary unit in covering relation with said panel.

HARRY A. SALLOP.